(12) United States Patent
Walker et al.

(10) Patent No.: US 6,691,132 B2
(45) Date of Patent: Feb. 10, 2004

(54) SEMANTIC ENCODING AND COMPRESSION OF DATABASE TABLES

(75) Inventors: Adrian D. Walker, Bristol, CT (US); D. Paul Benjamin, Berkeley Heights, NJ (US)

(73) Assignee: Reengineering LLC, Bristol, CT (US)

( * ) Notice: Subject to any disclaimer, the term of this patent is extended or adjusted under 35 U.S.C. 154(b) by 226 days.

(21) Appl. No.: 10/014,970

(22) Filed: Dec. 11, 2001

(65) Prior Publication Data

US 2002/0178171 A1 Nov. 28, 2002

Related U.S. Application Data

(60) Provisional application No. 60/291,482, filed on May 16, 2001.

(51) Int. Cl.[7] .............................................. G06F 17/30
(52) U.S. Cl. .......................................... 707/102; 707/10
(58) Field of Search ........................... 707/102, 10, 4; 704/500; 375/261; 380/217.28; 717/141; 711/1; 709/246; 382/253; 708/270; 712/225

(56) References Cited

U.S. PATENT DOCUMENTS

| | | | | |
|---|---|---|---|---|
| 4,630,288 A | * | 12/1986 | Longstaff et al. ........... 375/261 |
| 5,003,596 A | * | 3/1991 | Wood ........................... 380/28 |
| 5,546,575 A | | 8/1996 | Potter et al. | |
| 5,590,319 A | * | 12/1996 | Cohen et al. .................... 707/4 |
| 5,940,822 A | | 8/1999 | Haderle et al. | |
| 6,223,192 B1 | * | 4/2001 | Oberman et al. ............ 708/270 |
| 6,349,152 B1 | * | 2/2002 | Chaddha ...................... 382/253 |
| 6,397,324 B1 | * | 5/2002 | Barry et al. .................. 712/225 |
| 2003/0130855 A1 | * | 7/2003 | Babu et al. .................. 704/500 |

* cited by examiner

Primary Examiner—Diane D. Mizrahi

(57) ABSTRACT

A method and system are described to allow the encoding and compression of one or more tables of data by splitting each table into two or more sub-tables and allowing the splitting to be followed by permutation of the sub-tables. The method may also include the construction of an interconnection table using a collection of permutations and keys or key numbers, and to optionally allow the permuted tables to be padded with additional data, such that the original tables cannot be queried or reconstructed from the sub-tables without knowledge of the permutations and keys. The method and system also allows efficient querying of the sub-tables to retrieve information that was in the original tables, optionally over a network, and efficient reconstruction of the original tables, given knowledge of the permutations and key numbers. The method and system also supports billing for authorized access to tables of data, management of the permutations via index numbers, and rapid changes in encoding to guard against key theft.

35 Claims, 7 Drawing Sheets

SEMANTIC ENCODING AND COMPRESSION OF DATABASE TABLES

This application claims the benefit of Provisional Application No. 60/291,482 filed on May 16, 2001.

BACKGROUND OF THE INVENTION

1. Field of the Invention

This invention relates generally to databases and, in particular to the coding and compression of database information and tables.

2. Brief Description of the Prior Art

A database is a collection of logically related data, usually stored on computers, set up either to be questioned or queried directly, or to provide data to one or more applications. Typically, data in a database is logically represented as a collection of one or more tables. Each table is composed of a series of rows and columns. Each row in the table represents a collection of related data. Each column in the table represents a particular type of data. Thus, each row is composed of a series of data values, one data value from each column.

A database and its applications may reside on one computer, or the database may be distributed over a number of computers that are connected by a network, such as a local area network, a virtual private network, or the Internet. Duplicates of part or all of a database may be stored on different computers for performance, availability, or other reasons. The applications that use a database may reside on one of the computers where the database resides or may reside on other computers connected to the database over a network.

A database that is logically organized into tables of data is typically managed by a Relational Database Management System (RDBMS). The RDBMS provides commonly needed services familiar to one skilled in the art, such as: means to retrieve data in a related way from more than one table in response to a question; means to update data; means to ensure integrity of the data with respect to constraints; means to control access to the data; and means to index the data for rapid access.

Typically, a question put to a database will be written in a notation that is based on a mathematical construct called the Relational Algebra. The answer to a question is itself a table. There are three main operations in the Relational Algebra that can be used together to construct an answer table for a question: Projection of a table on some of its columns results in a new table consisting of the set of rows obtained by omitting the remaining columns; selection of rows meeting a certain criterion from a table results in a new table consisting of only those rows of the original table that meet the criterion; joining two tables results, conceptually, in a new table having rows formed by appending a row of the first table to a row of the second table; and selecting only such rows that have the same values in certain designated columns in the two tables. One skilled in the art will recognize the constructs of the Relational Algebra in the Structured Query Language (SQL) that is a common means of accessing and manipulating data in an RDBMS.

The data in a database often contains information that should be held in confidence and that should only be made available to authorized users or programs. For example, the data may be confidential to a certain business organization or it may contain military secrets. One skilled in the art will be familiar with RDBMS access controls. These access controls basically allow certain privileges, such as the permission to question or to update the data, to selected user identifications or programs based on the knowledge of a password or passwords. As such, RDBMS access controls provide a first line of defense for confidential information that is held in a database. However, experience shows that while there are strong reasons for making data from an RDBMS available over networks to authorized users or programs, there is an ongoing cycle of penetration by unauthorized users followed by incremental improvement in access controls. This can be seen by visiting the United States National Infrastructure Protection Center (NIPC) at www.nipc.gov. For example, NIPC advisory 01-003 lists a security hole that allows unauthorized users to tunnel Structured Query Language (SQL) requests through a public connection to a private back-end network. It is believed that unauthorized users have obtained the details of many credit cards by such methods, see www.sans.org/newlook/alerts/NTE-bank.htm.

A second line of defense that is familiar to one skilled in the art is to encrypt some or all of the entries in the tables in a database using a standard method, such as the Data Encryption Standard (DES) or public key cryptography. However, this line of defense is also subject to a cycle of penetration followed by improvements. In addition, there is currently active research into advances in mathematics and software that could lead to rapid methods of unauthorized decryption of data that has been encrypted using these standard methods. Moreover, some information, such as the number of rows in a table, remains available to unauthorized users or programs. In addition, the performance of the RDBMS for authorized users is reduced by the need to perform decryption for every query and encryption for every update.

There is a need in the art for an improved method of hiding data from unauthorized users and programs, while making it efficiently available to those who are authorized.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented encoder for encoding tables in a database, and optionally simultaneously reducing the space required to store the tables. This invention offers a third line of defense based on a semantic encoding method and system that is different from either access control or encryption of database entries. Semantic encoding can be used standalone or with any combination of prior methods.

It is an object of the present invention to provide an improved system for encoding tables in a database. It is another object of the present invention to provide an improved system that is compatible with prior methods for securing data in a database. It is another object of the present invention to provide a system such that, after an unauthorized attempt to decode a database table, an attacker cannot tell by looking at the output that he has or has not succeeded in reconstructing the table correctly. It is a further object of the present invention to provide a system such that, after an unauthorized attempt to decode a database table, an attacker cannot tell by looking at the output how many rows were in the original table. It is a still further object of the present invention to provide an improved system for compressing a database while making it secure. It is another object of the present invention to provide an improved system for making only certain approved parts of a database available to particular users, groups of users, or applications. It is a further object of the present invention to provide an improved system for protecting a data provider's commercial interest in the data in a database, in a situation in which authorized users are billed for answers to questions that they put to the database.

Specifically, the present invention relates to a novel way of securing the contents of a database and of making those contents available only to authorized individuals, groups of individuals, or programs. Authorization is given by making known a collection of keys or key numbers and/or permutations. This invention can be used in isolation and it can also be used to complement the prior art. The present invention is based on a principle that is different from the principles underlying the prior art that includes access control and encryption. While access control and encryption-based methods can make unauthorized access to data difficult, the present semantic encoding system can make such access impossible.

In accordance with the present invention, a method and system are described to allow the encoding and compression of one or more tables of data by splitting each table into two or more sub-tables, and to allow the splitting to be done using a collection of permutations and keys or key numbers, such that the original tables cannot be reconstructed from the sub-tables without knowledge of the permutations and keys or key numbers. A table is split along its columns into two or more sub-tables. The numbering of the rows in the sub-tables is permuted according to an equation containing permutations and keys or key numbers. For certain kinds of tables, an interconnection table containing permuted row numbers is formed. The sub-tables and the interconnection table are optionally padded with misleading rows. The process of splitting, permuting, forming an interconnection array, and padding may optionally be repeated on the sub-tables, and so on. An authorized user or program that knows the permutations, the keys or key numbers, and how they are combined in equations, can efficiently and correctly query and update the sub-tables and the interconnection table(s), and can efficiently and correctly reconstruct the original table. An unauthorized user or program that does not know the permutations, keys or key numbers or equations, can optionally be prevented from obtaining any rows of the original table. If the encoding is configured to allow an unauthorized user or program to obtain, amongst many others, some of the rows of the original table, that user or program still cannot tell which are the correct rows and which are not. An unauthorized user or program cannot know what effect any updates he or it makes will have on the data seen by authorized users or programs; that is, an unauthorized user or program cannot reliably insert misleading data and cannot selectively delete chosen data.

The present invention, both as to its construction and its method of operation, together with additional objects and advantages thereof, will best be understood from the following description of specific embodiments when read in connection with the accompanying drawings.

DETAILED DESCRIPTION OF THE PREFERRED EMBODIMENT

Figure 1:
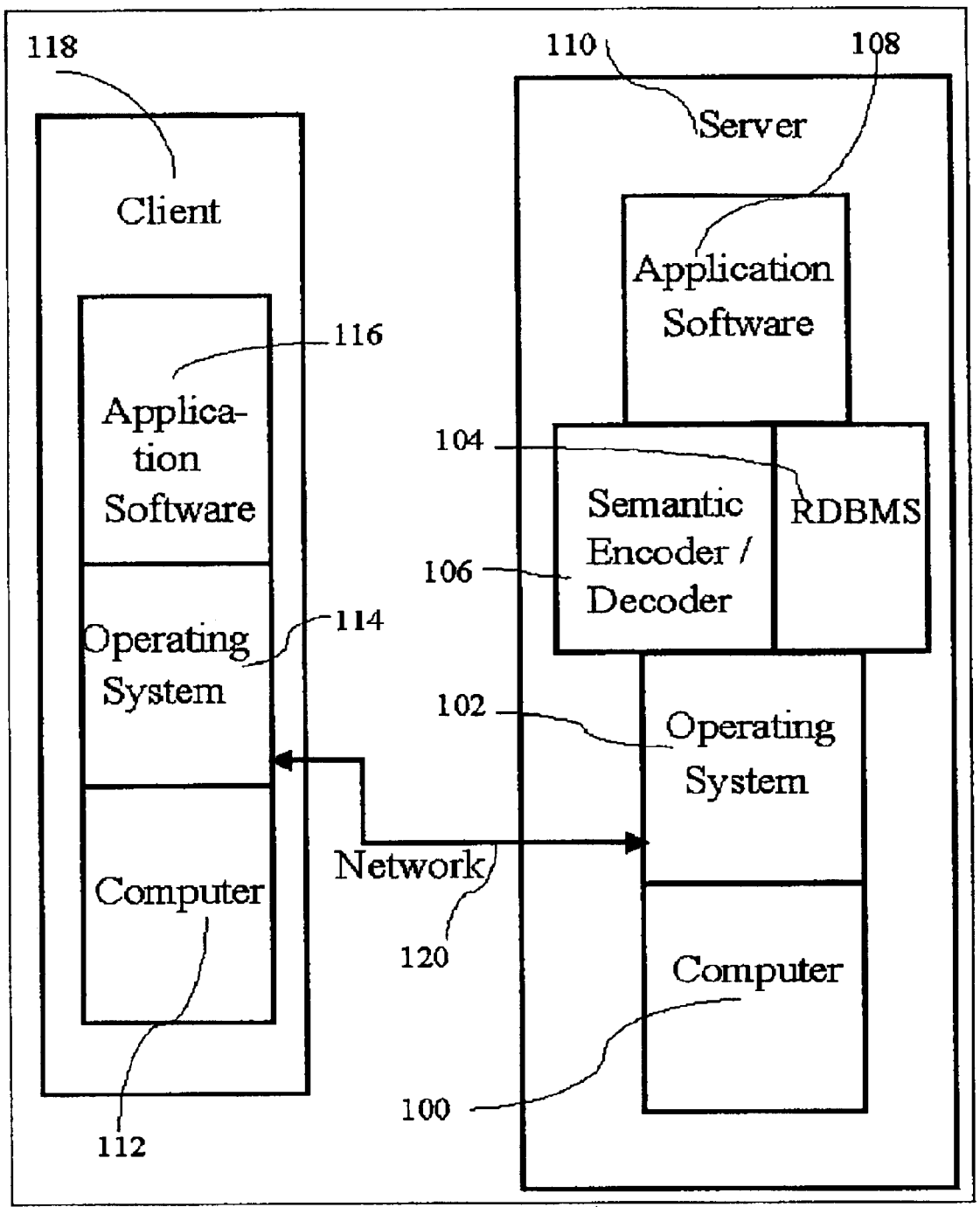
FIG. 1 is a block diagram of the hardware and software environment of a system according to the present invention.
Figure 2:
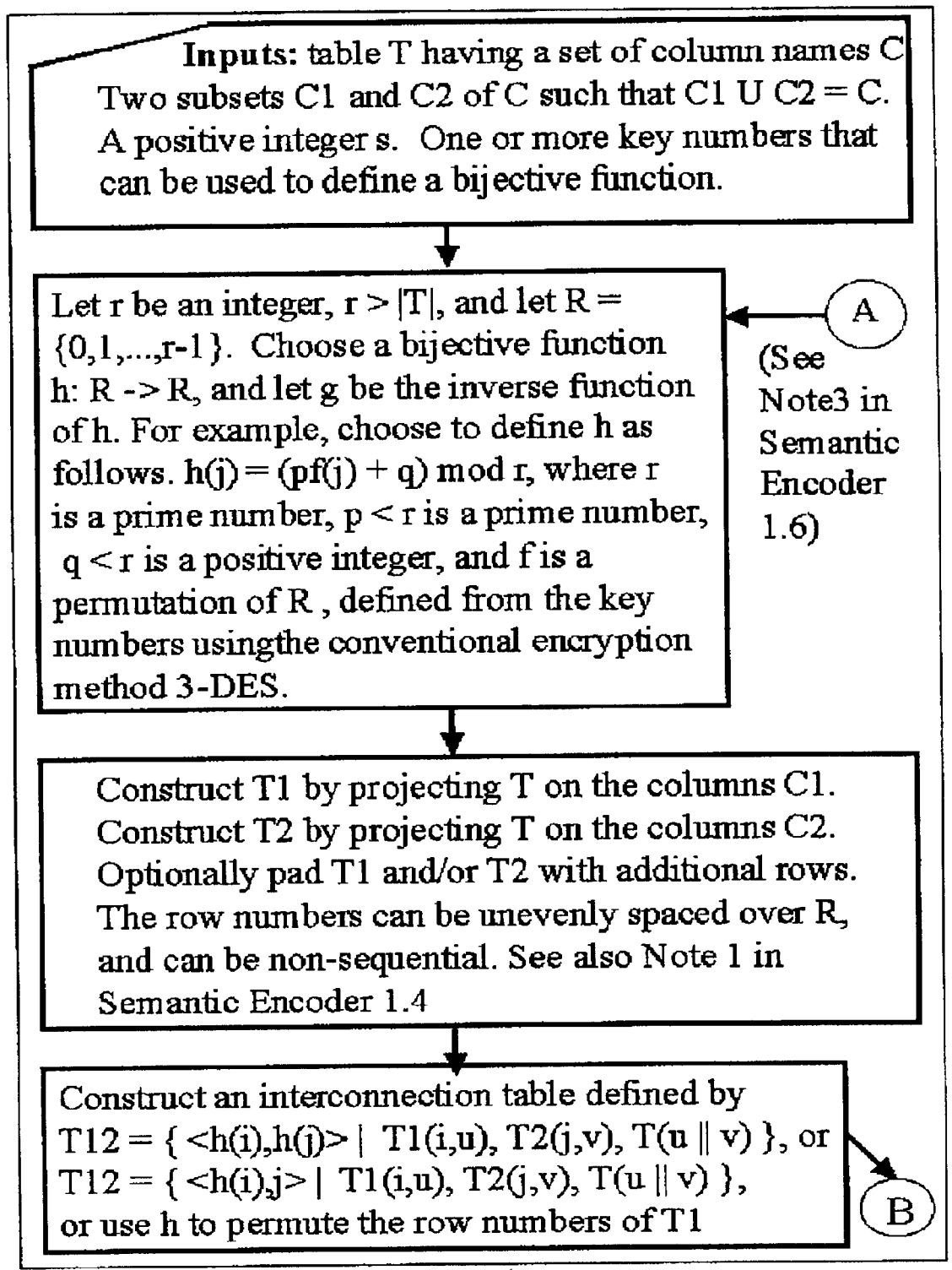
FIG. 2 is a flow diagram of the semantic encoder system according to the present invention.
Figure 3:
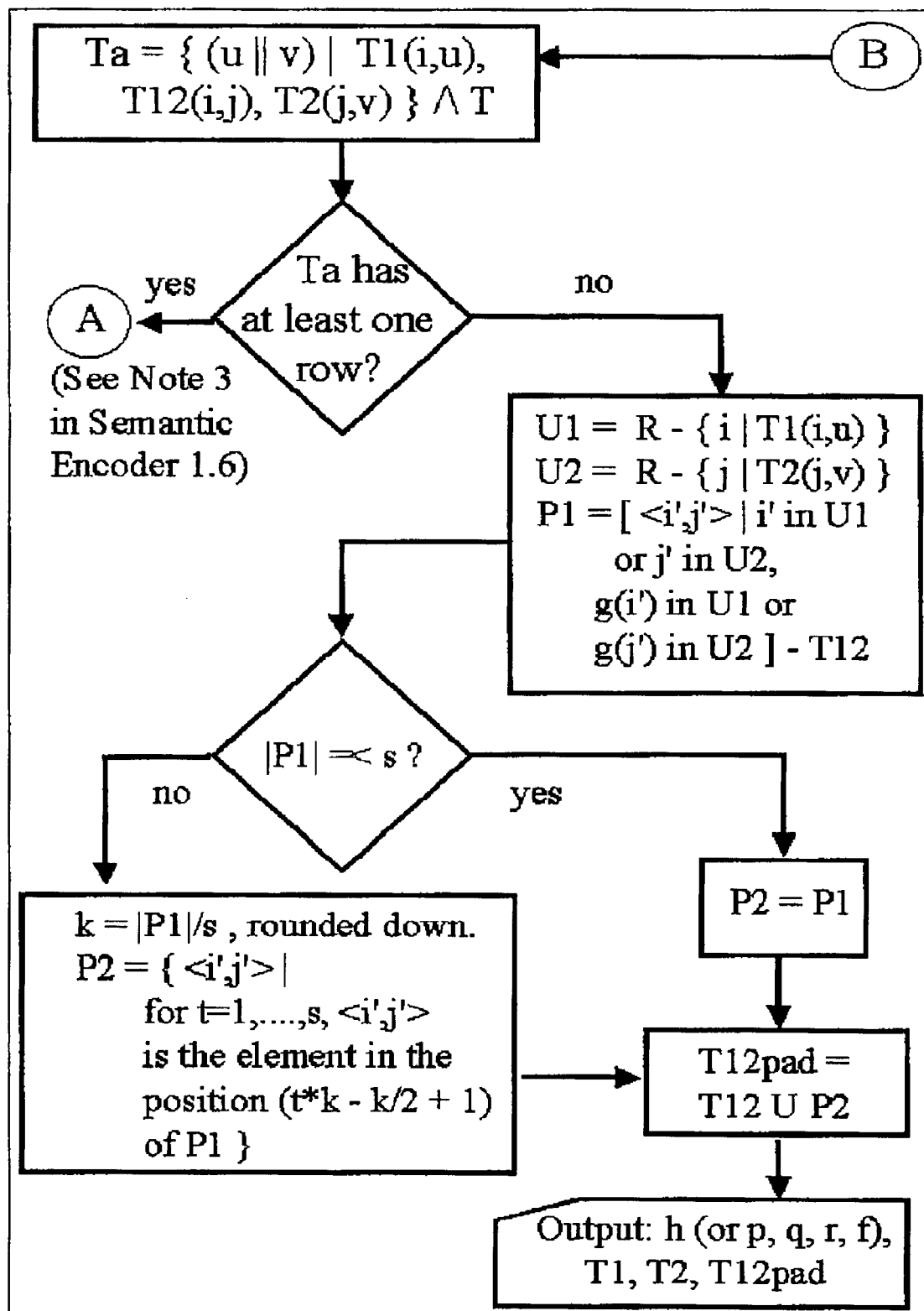
FIG. 3 is a continued flow diagram of the semantic encoder system according to the present invention.
Figure 4:
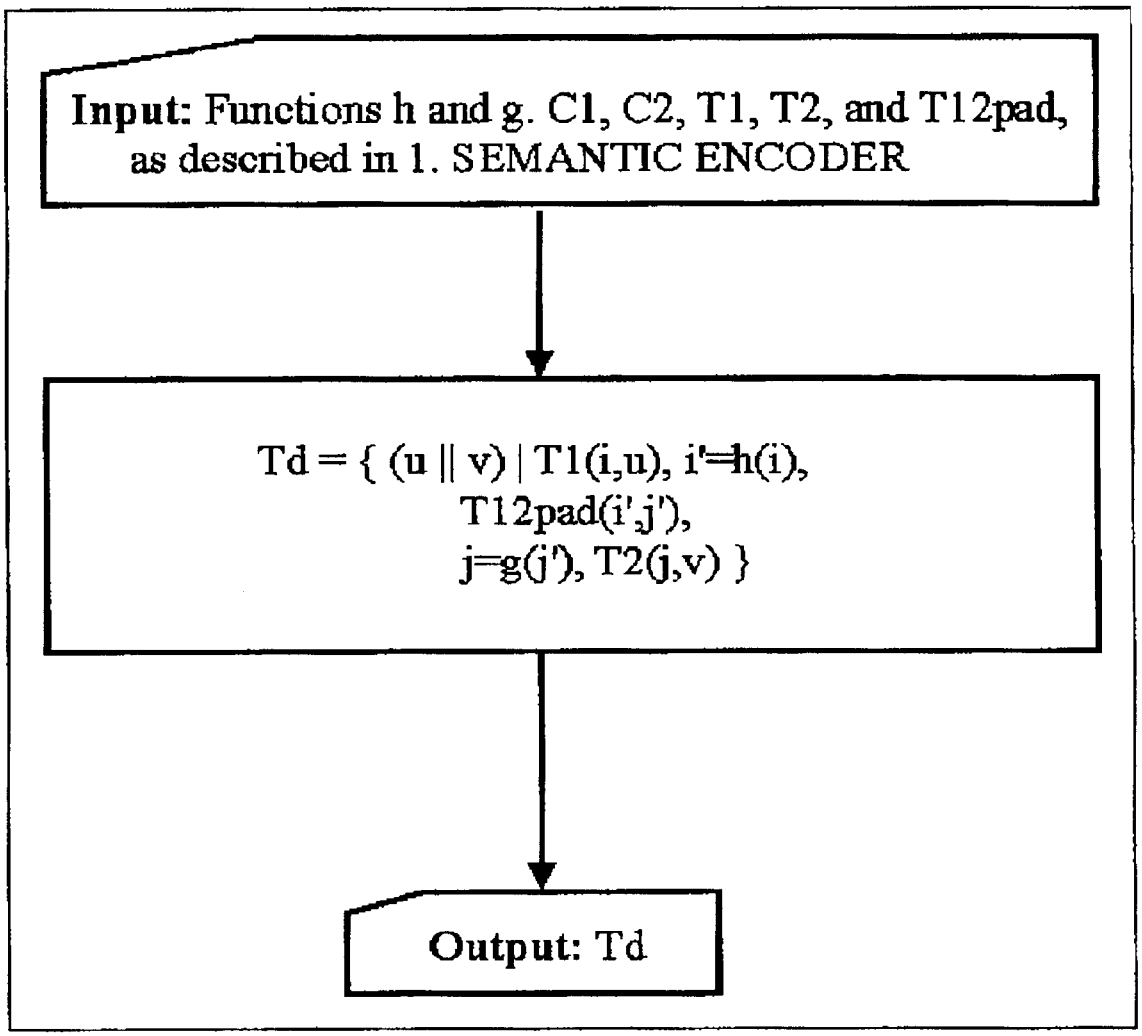
FIG. 4 is a flow diagram of the semantic decoder system according to the present invention.

FIG. 1 is an exemplary hardware and software environment used to implement the preferred embodiment of the invention. The present invention is typically implemented using one or more computers 100, which may optionally be servers on a network 120. Such a computer or server will normally have an operating system 102 (e.g., Unix), and may optionally have RDBMS software 104 installed on the system. Semantic encoder/decoder software 106 that realizes and embodies the present invention may optionally use the RDBMS 104 and parts of the application software 108 to carry out relevant parts of the functions described in FIGS. 2–7 hereinafter.

If the invention is to be used over a network 120, as described in FIGS. 2–7, then the server or servers 110 may communicate over the network 120 with one or more clients 118. A client 118 is typically similar to a server 100 in comprising at least a hardware computer 112, an operating system 114 and some application software 116. Optionally, a client 118 may also have RDBMS software and/or semantic encoder/decoder software installed.

One skilled in the art will readily see how the components in FIG. 1 are used to realize various embodiments of the present invention as described in FIGS. 2–7. The present invention may be implemented as a method, apparatus, or article of manufacture using standard programming and/or engineering techniques to produce software, firmware, hardware, or any combination thereof. The term "article of manufacture" (or alternatively, "computer program") as used herein is intended to encompass a computer program accessible from any computer-readable device, carrier, or media. Of course, those skilled in the art will recognize that many modifications may be made to this configuration without departing from the scope of the present invention.

Figure 7:
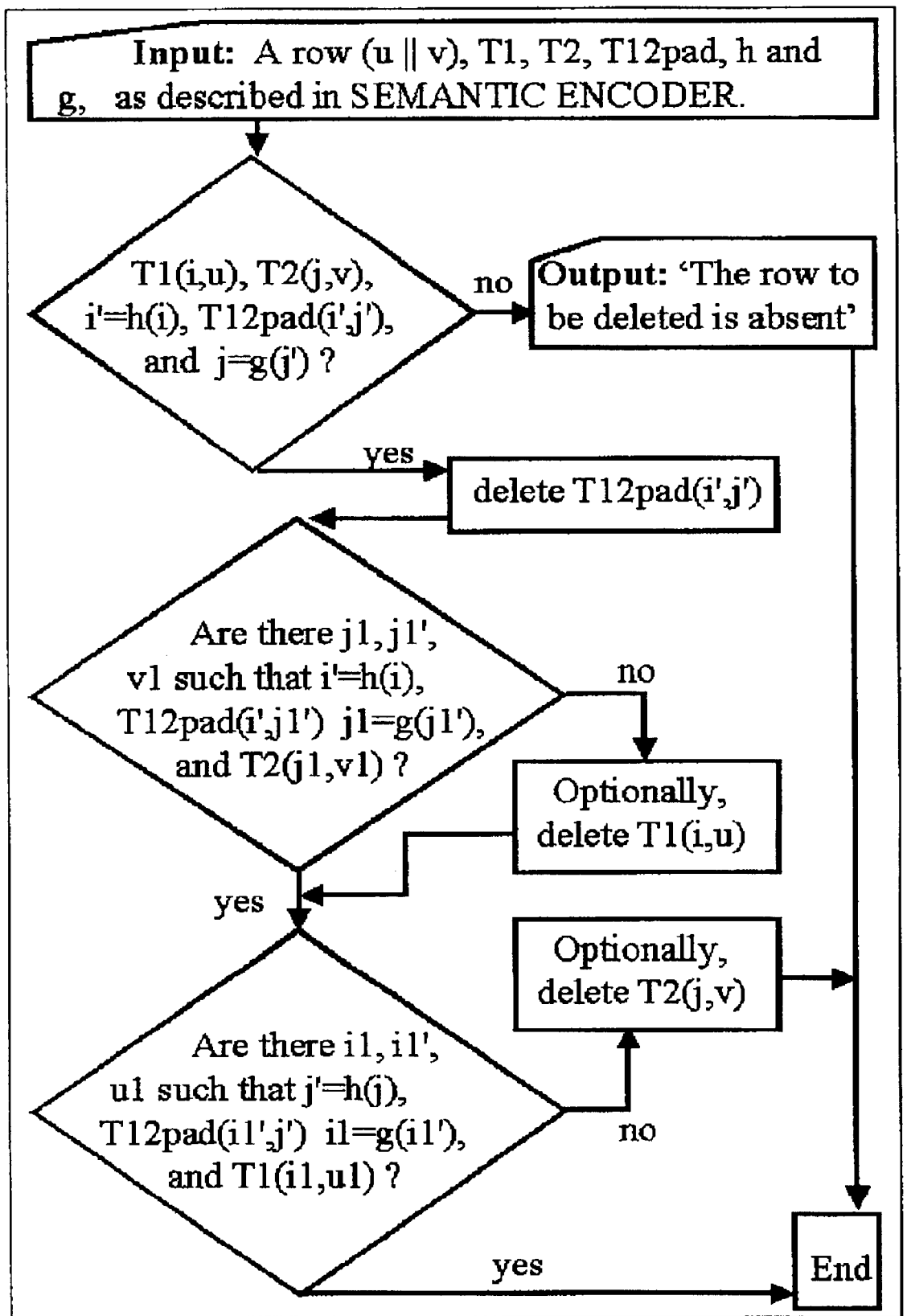
FIG. 7 is a flow diagram for deleting a row from a table in the system according to the present invention.

The preferred embodiment, described hereinafter and illustrated in FIGS. 2–7, represent the various subparts to the system of the present invention: semantic encoder (FIGS. 2–3); semantic decoder (FIG. 4); measure of padding security (FIG. 5); inserting a row into a table (FIG. 6); and deleting a row from a table (FIG. 7). Each subpart will be discussed in detail hereinafter.

Semantic Encoder 1.1 Inputs

A table T having a set of column names C. Two subsets C1 and C2 of C such that C1 U C2=C. A positive integer s indicating the amount of padding required. One or more keys or key numbers that can be used to define a bijective function.

1.2 Choose a Function h

Let r be an integer, r>|T|, and let R={0,1, . . . , r−1}. Choose a bijective function h: R−>R, and let g be the inverse function of h. For example, choose to define h as follows: $h(j)=(pf(j)+q) \mod r$, where r is a prime number, p<r is a prime number, q<r is a positive integer, and f is a permutation of R, defined from the keys or key numbers using the conventional encryption method 3-DES.

1.3 Profection and Row Numbering

Construct a table T1 by taking the relational algebra projection of T onto the column names C1. Re-order the rows of T1. Optionally add more rows to T1 containing plausible information (semantic padding). Then assign a unique row number from R to each of the rows of T1. The row numbers can be unevenly spaced over R, and can be non-sequential. (See Note 1, below.) Construct a table T2, using the column names C2, in the same manner as the construction of T1.

1.4 Interconnection and Permutation

Construct an interconnection table defined by T12={<h(i),h(j)>|T1(i,u), T2(j,v), T(u||v)} where T(u||v) denotes a row of T with entries u under the column names C1 and entries v under the column names C2. Note that u||v is not necessarily a simple concatenation of a row u with a row v.

Note 1: with certain patterns of data in T, e.g. if C1 contains a key of T, we can simplify this step by omitting the interconnection array, reordering the rows T1, and simply permuting the row numbers of T1 according to the function h. We can also optionally leave duplicate rows in T1 and/or T2.

Note 2: We can alternatively define T12={<h(i),j>|T1(i,u), T2(j,v), T(u||v)}

1.5 Check the Choices of Row Numbers and of the Function h

Construct Ta={(u||v)|T1(i,u), T12(i,j), T2(j,v)}∧T. If Ta has at least one row, optionally go back to step 1.3 and assign different row numbers to T1 and/or T2, such that Ta has no rows. If no such row numbers for T1 and T2 can be found optionally go back to step 1.2.

1.6 Padding

The input positive integer s is the desired amount of padding. Let U1=R−{i|T1(i,u)} and U2=R−{j|T2(j,v)}, and define an ordered set: P1=[<i',j'>|i' in U1 or j' in U2, g(i') in U1 or g(j') in U2]−T12; let P2=P1, if |P1|=<s. Otherwise, let k=|P1|/s, where '/' denotes division and rounding down, and let: P2={<i',j'>| for t=1, . . . ,s, <i',j'> is the element in the position (t*k−k/2+1) of P1}. Finally, let T12pad=T12 U P2.

Note 3: If it is desired to prevent an unauthorized user or program from correctly concluding that a certain row is not in T, one skilled in the art will readily see how to modify the above steps to allow a controlled subset of T to be present in {(u||v)|T1(i,u), T12pad(i,j), T2(j,v)}. If this is done, an unauthorized user or program still cannot know which rows, amongst others, were actually in T. One skilled in the art will also readily see how to distribute the rows in P2 in other useful ways.

1.7 Check the Padding

Figure 5:
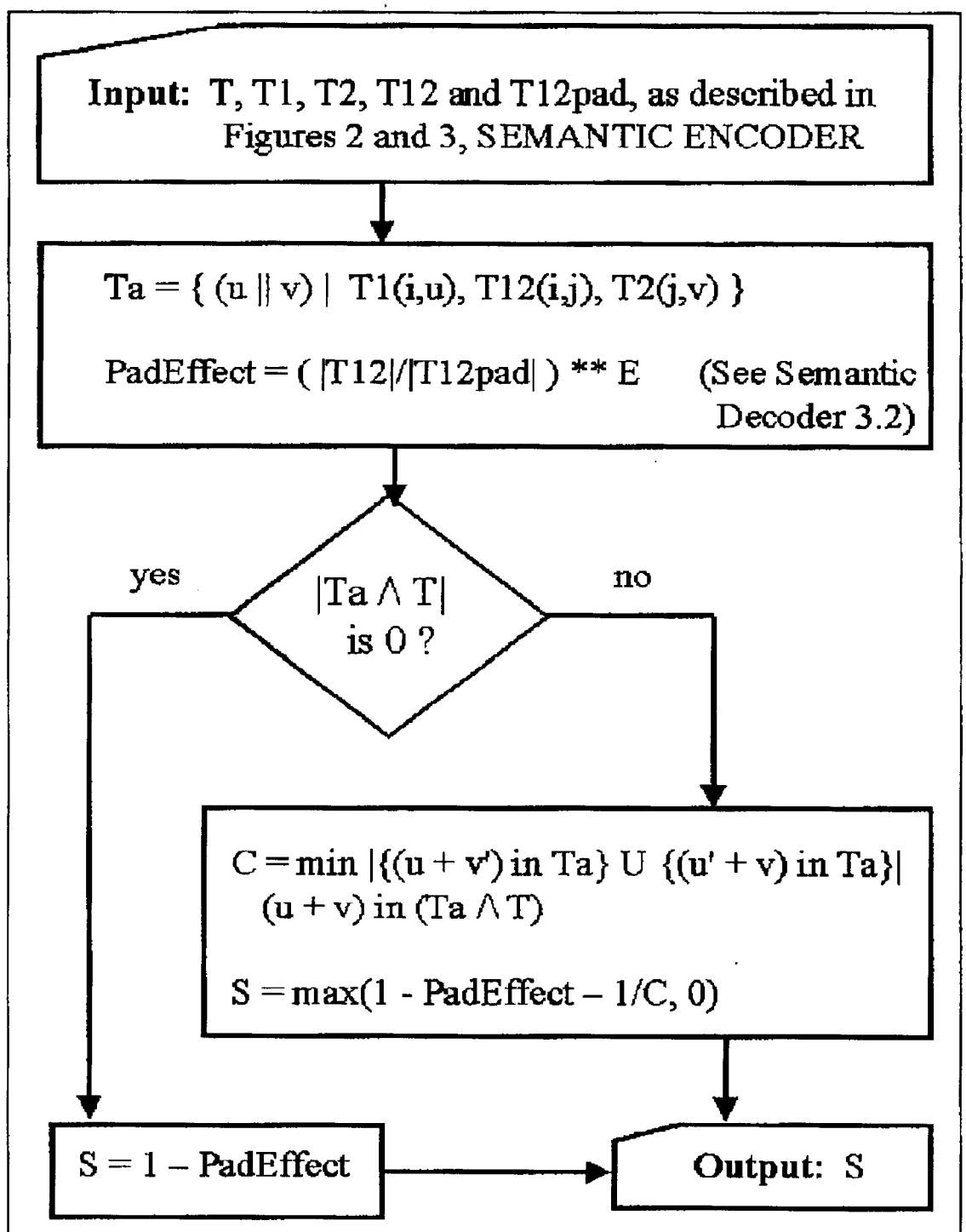
FIG. 5 is a flow diagram of the measure of padding security system according to the present invention.
Figure 6:
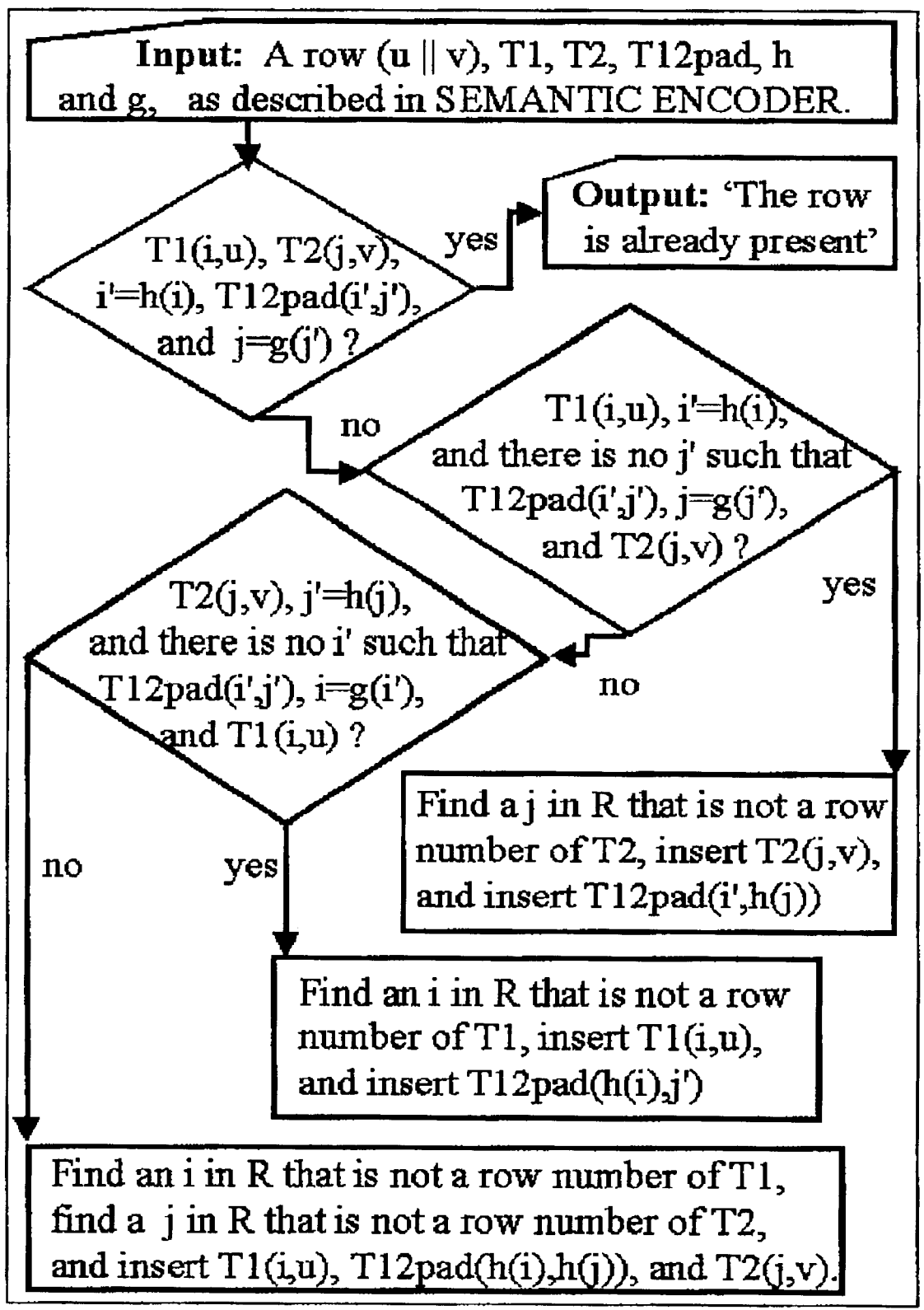
FIG. 6 is a flow diagram for inserting a row into a table in the system according to the present invention.

Find the padding security of T1, T2, T12pad using a measure, as illustrated in FIG. 5. If the padding security needs to be increased, go back to step 1.3 or to step 1.2.

1.8 Output

The function h (e.g., defined by p, q, r, and f), T1, T2, T12pad.

Semantic Decoder

2.1 Inputs

Functions h and g, (for example specified using p, q, r, and f), C1, C2, T1, T2, and T12pad, as described above in the "Semantic Encoder" description.

2.2 Decode

One skilled in the art will easily see how to adapt the decode procedure described herein to the cases described in step 1.4 of the "Semantic Encoder" description, as well as how to adapt the procedure described herein to other ways of defining the functions h and g. Let h be the function defined by h(j)=(pf(j)+q) mod r, and let g be the inverse function of h. Construct the table Td={(u||v)|T1(i,u), i'=h(i), T12pad(i',j'), j=g(j'), T2(j,v)}, where (u||v) denotes a row with entries u under the column names C1 and entries v under the column names C2. Note that u||v is not necessarily a simple concatenation of a row u with a row v.

2.3 Output

Output the table Td.

Padding Security

3.1 Input

T, T1, T2, T12, T12pad as described in the "Semantic Encoder" description.

3.2 Padding Effect

Ta={(u||v)|T1(i,u), T12(i,j), T2(j,v)}

PadEffect=(|T12|/|T12pad|)**E, where E is a positive integer, e.g., 10.

A smaller value of E will make the padding security measure call for more pad rows in the interconnection table.

3.3 Confusion

If |Ta∧T| is not 0 then
C=min|{(u+v') in Ta}U{(u'+v) in Ta}|
(u+v) in (Ta∧T).

3.4 Padding Security $$S = \begin{vmatrix} 1 - \text{PadEffect}, & \text{if}|Ta \wedge T|\text{is } 0 \\ \max(1 - \text{PadEffect} - 1/C, 0), & \text{otherwise} \end{vmatrix}$$

3.5 Output

The number S, between 0 and 1, that measures padding security. A value of S close to 1 corresponds to high padding security.

Billing of Client Questioning of Servers via a Network

This section uses the notations set out in "Semantic Encoder" and "Semantic Decoder" descriptions.

4.1 Set Up One More Clients

Let the function h (or p, q, r, f), C1, and C2 be as described in the "Semantic Encoder" description. Transmit h, or p, q, r, and f or the index number of f, C1, and C2, encrypted by conventional means, to the client(s) on a network.

4.2 Set Up One or More Servers

Let T1, T2, and T12pad, as described in the "Semantic Encoder" description, be set up, optionally in an RDBMS, on one or more servers connected to the network.

4.3 Client Asks Question

Suppose a client wishes to ask for the rows (u||v) of T such that u has certain properties P. Client transmits C1 and P to server(s).

4.4 Server(s) Send Semantically Encoded Response to Question

A server receiving the question consisting of C1 and P responds by sending: T1P=a subset of T1 including {<i, u>|T1(i,u), u has properties P}; T2P=a subset of T2 including {<j,v>|T1P(i,u), i'=h(i), T12pad(i',j'), j=g(j'), T2(j,v)}; T12padP={<i',j'>|T1P(i,u), i'=h(i), T12pad(i',j')}to the client.

4.5 Client Semantically Decodes Response to Question

A client receiving the response T1P, T2P and T12padP to its question C1 and P, uses it knowledge of the functions h and g, to semantically decode the response as TP={(u||v)|T1P(i,u), i'=h(i), T12padP(i',j'), j=g(j'), T2P(j,v)}. It will be clear to one skilled in the art how to modify steps 4.4 and 4.5 to take account of the alternatives describe in the "Semantic Encoder" description. It will also be clear how to extend steps 4.3 to 4.5 to the case that the property P applies to both u and v.

4.6 Server Organization Bills Client Organization for use of Data

Server organization can at any time change the values of h or of p, q, r, and f and reissue the new values to just those client organizations that are in good standing from the point of view of payments. Server organization can use different functions h or p, q, r, f values for different groups of clients or for different client organizations.

Insert a Row Into a Table 5.1 Input

A row (u∥v), T1, T2, T12pad h and g, as described in the "Semantic Encoder" description.

5.2 Check that the Row to be Inserted is not Already Present

If T1(i,u), T2(j,v), i'=h(i), T12pad(i',j'), and j=g(j'), then output 'the row is already present', otherwise go to 5.3.

5.3 Insert into T2 and T12pad

If T1(i,u), i'=h(i), and there is no j' such that T12pad(i',j'), j=g(j'), and T2(j,v) then find a j in R that is not a row number of T2, insert T2(j,v), and insert T12pad(i',h(j)) else go to 5.4.

5.4 Insert into T1 and T12pad

If T2(j,v), j'=h(j), and there is no i' such that T12pad(i',j'), i=g(i'), and T1(i,u) then find an i in R that is not a row number of T1, insert T1(i,u), and insert T12pad(h(i),j') else go to 5.5.

5.5 Insert into T1, T2, and T12pad

If there is no i' such that, for some j1', T12pad(i',j1'), i'=h(i), and T1(i,u) and there is no j' such that, for some i1' T12pad(i1',j'), j'=h(j), and T2(j,v), then find an i in R that is not a row number of T1, find a j in R that is not a row number of T2, and insert T1(i,u), T12pad(h(i),h(j)), and T2(j,v).

Delete a Row From a Table 6.1 Input

A row (u∥v), T1, T2, T12pad h and g, as described in the "Semantic Encoder" description.

6.2 Check that the Row to be Deleted is Actually Present

If T1(i,u), i'=h(i), T12pad(i',j'), j=g(j'), and T2(j,v), then go to 6.3, otherwise output 'the row to be deleted is absent'.

6.3 Delete the Row

Delete T12pad(i',j').

6.4 Optionally Remove Unused Entries in T1 and T2

If there is no j1, j1', v1 such that i'=h(i), T12pad(i',j1') j1=g(j1'), and T2(j1,v1), then delete T1(i,u). If there is no i1, i1', u1 such that j'=h(j), T12pad(i1',j') i1=g(i1'), and T1(i1, u1), then delete T2(j,v).

Number Permutations Using a Base Factorial Representation 7.1 Input

An initial permutation expressed as a list P=[1,2, ... n]. A base-factorial number I consisting of a list of digits of the form [d(n−1), ... ,d(j), ... ,d(2),d(1)]. In the base-factorial number I, the digit do) takes a value between 0 and j inclusive, and is interpreted as representing the decimal number $d(n-1)*(n-1)! + \ldots + d(j)*j! + \ldots + d(2)*2 + d(1)$ where $j! = j*(j-1)* \ldots * 1$.

7.2 for j=1 to (n−1) do

Swap the jth and the (j+d))th elements of P.

7.3 Output

The resulting permutation P.

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, virtual private network, peer-to-peer network, or standalone personal computer, could be used with the present invention. The permutations used in the invention can be generated by many different methods, including software- and/or hardware-based pseudo-random number generators, software- and/or hardware-based encryption methods, or natural sources of truly random numbers.

A typical way of hiding a table of information in a database from unauthorized users or programs is either by access controls with passwords, or by encrypting the data in the table. The present invention is directed to another method that can be used alone, or together with the usual methods. In our method, the table to be hidden is not actually stored in the database. Our idea is to take that table, draw a vertical line through it, and split it along that line into two sub-tables. Then we shuffle the rows in the two sub-tables, and we store them in the database instead of the original table. In this process, we keep some key information aside. Without the key information, an unauthorized user of the program cannot know how to combine the lines in the two sub-tables to form a line in the original table. On the other hand, an authorized user or program can use the key information and the two sub-tables, together with a standard database query language (such as SQL) to efficiently find the lines in the original table.

When we split a table into two sub-tables, the sub-tables may contain duplicated lines. For example, a table with two columns, e.g., Social-Security-Number and Male-Female, will result in two sub-tables each having one column. SSNs are in general unique, so the first subtable will not contain the same line twice. However, the second subtable has only entries Male or Female, perhaps each repeated many times. We can either keep all the lines in the second sub-table, or we can compress it to just two lines, namely Male and Female. If we choose to compress it, we shall use a third table, that we call an interconnection table, to contain information about how to find lines in the original table. We shall number or label the lines in the two sub-tables, and the interconnection table will have two columns that contain encoded versions of those line numbers or labels.

In our example, an original table with SSNs and Male-Female data is split into two sub-tables, the second subtable is compressed down to have just two lines, and we create an interconnection table. We can pad the interconnection table with additional, fictitious correspondences between lines in the sub-tables.

The key information that we keep can be chosen so that the lines of padding do not lead to entries in the reconstructed original table. An unauthorized user or program could not reconstruct the original table without the key information, but, even if both the sub-tables were compressed by removing some duplicated lines, he or it could see, from the interconnection table, how many lines were in the original table. We can hide that information by padding the interconnection table with additional lines. If the useful line numbers in the interconnection table were all, e.g., in the range between 1 and 100, and the padding line numbers were all, e.g., in the range between 700 and 800, an unauthorized user or program could try guessing that one of the ranges was padding, and could concentrate on the other to begin an attempt to crack the encoding. However, if the useful numbers are intermingled with the ones for the padding, even that small step is blocked.

When we split an original table into two sub-tables, we keep some key information to allow an authorized user of program to reconstruct the original table. This key information can, amongst other things, be a key number, e.g. a key for using DES encryption to create a permutation that is used to change the entries in an interconnection table.

Our source, or original table, can actually be split into more than two sub-tables. For example, an original table with columns SSN, Male-Female, Phone, Salary, and Zip could be split into subtable1 with columns Male-Female and Salary, subtable2 with columns Phone and Zip, and subtable3 with the column SSN. A column could even appear in more than one subtable if needed. In our running example, subtable1 has columns Male-Female and Salary. To further disguise the salary information, we can split the entries in the salary column, so that subtable1 has columns Male-Female, Salary-Part1 and Salary-Part2. Then, a Salary of 100000 would appear as an entry of 100 under Salary-Part1 and an entry of 000 under Salary-Part2.

When we split an original table into two or more sub-tables, we can also further split the sub-tables, either along column boundaries, or by splitting the data items in a column, or both. In our example, an original table with columns SSN, Male-Female, Phone, Salary, and Zip is split into subtable1 with columns Male-Female and Salary, subtable2 with columns Phone and Zip, and subtable3 with the column SSN. If, e.g., we wish to further disguise the salary information, we can pad subtable1 with additional lines containing fictitious salaries. Even if one of these fictitious salaries is the same as the salary for a real line, our method can be configured to make sure that a naive unauthorized attempt to reconstruct the original table does not allow the padding to accidentally contribute a valid line. Not only can we ensure that the padding does not accidentally contribute a valid line during a naive unauthorized attempt at reconstruction, we can also ensure that such an attempt produces confusingly many lines of information that could have been in the original table, but in fact were not.

So far we have described an original database table as the source of the information to be semantically encoded. We started from an original table, and we encoded it in two or more sub-tables. We placed the sub-tables in the database, and we erased the original table. That is how we would proceed to semantically encode the tables in an existing database. However, a database may be created initially by bulk loading data from another source into it, typically using a custom program or script to drive statements in the database language SQL. In such a case, there is no need to load data into an original table. Rather, we load data directly, into the semantically encoded sub-tables and interconnection tables, from the data source. Of course, we keep key information aside during this process.

Semantic encoding is entirely different from methods in the prior art for securing databases, such as access controls and encryption. For this reason, and because it is based on a technique that is known to be impossible to break by the usual methods of attacking data protected by the prior art, our method can be used as the only security technique. While it is reasonable to use Semantic Encoding as the only security techniques in many circumstances, it can also be used in combination with the prior art.

Suppose we have a database with information about military units and their locations. A semantically encoded version of the database can not only mislead an opponent into thinking that the real unit A is at the real location X (when in fact it is at Y), but it can also mislead an opponent into thinking that a fictitious unit F (added during padding) is at a real location Z.

In the military example, if there are many different units at the location X, then X need only appear once in a subtable. Likewise, if say, there are Tomahawk cruise missiles at many locations, then the word 'Tomahawk' need only appear once in a subtable, rather than many times in an original table. Of course, the information linking units to locations is kept, encoded in an interconnection table, but the total space needed to store the information can be much smaller than is needed to store the original table. So, the information can be transmitted securely, and more efficiently. An attacker may be able to see the interconnection table, but it is of no use without the key information.

An interconnection table, together with the key information, allows an authorized user or program to reassemble an original table from the sub-tables, while ignoring any padding. If we wish to limit a particular user to one area of the original table, we can structure an interconnection table and its key information so that the rest of the real data is also treated as though it were padding, and so is ignored. Thus, the user sees correctly only what we want him to see.

An interconnection table contains numbers or labels, that, when used together with the key information, correspond to numbers or labels of the lines of the sub-tables. There is no need for the numbers or labels on the lines of the sub-tables to be sequential. For example, we could number the first few lines of a subtable as 4, 2, 99, 50 or label them as AAB, XSD, EEW, QZA and so on.

Semantic encoding allows an authorized user or program to reconstruct an original table from the key information, the interconnection table, and the sub-tables by computations on line numbers or labels. So, there is no need to keep the lines in the sub-tables in the same order as the one that would be indicated by the original table. Indeed, Semantic Encoding calls for the order of the lines in the sub-tables to be permuted, i.e., shuffled.

We number or label the lines of the sub-tables, to see which two lines go together to make up a line of the original table. If this is all that we did (and we did not use an interconnection table), then any user or program could use the numbers or labels to reconstruct lines of the original table. However, we also change the numbers or labels, using the key information, so that only a user or program having the key information can see which lines of the sub-tables should fit together to make up a correct line in the original table.

We number or label the lines of the sub-tables, to see which two lines go together to make up a line of the original table. If we use an interconnection table, it has lines containing numbers or labels. If this is all that we did, then any user or program could use the numbers or labels in the interconnection table to reconstruct lines of the original table. However, we also change the numbers or labels in the interconnection table, using the key information, so that only a user or program having the key information can see which lines of the sub-tables should fit together to make up a correct line in the original table.

A permutation, such as 1,3,2 can be read as a recipe for changing the line numbers in a table. In this example, it leaves 1 unchanged, changes 2 to 3, and changes 3 to 2. Likewise, the permutation A,C,B can be used to change the labels of lines. A key number can be used with a conventional encryption method such as DES to specify a permutation. We can also use an equation, such as $y=3*x+1 \mod 5$, to shuffle numbers or labels. Since a permutation can be a list of numbers, and a key can be a number, we can combine them using an equation. If we do this, then the structure of the equation, and its constants (in this case 3, 1, and 5) become part of the overall key information that we keep aside during semantic encoding, and that we make available for decoding and updating.

Rather than generating permutations, such as 1,3,2 when needed, we can store them in the database. They can be visible to potential attackers, provided that the ways in which they are combined in equations are kept aside as part of the key information.

If it is desired to keep a collection of permutations in the database so that we can combine them using equations, we can index them, so that we can specify that an equation is to use, say permutations number 5, 11, and b 502.

If it is desired to keep a collection of permutations in the database so that we can combine them using equations, it is useful if a permutation can be computed from its index, and if the index numbers are in a range so that they can easily be stored and manipulated using ordinary computer arithmetic. Using base-factorial (rather than base 2 or base 10) notation is a convenient way of doing this.

If a database is encrypted by conventional means, such as DES or public key cryptography, changing the encryption is a major undertaking, that may require the database to be unavailable to authorized users and programs for a commercially significant amount of time. With semantic encoding, on the other hand, new key information can be prepared while the database is being queried, and a switchover to the new key information can be almost instantaneous.

An authorized user or program can use the key information, together with a standard database language such as SQL, to efficiently operate on a semantically encoded database in much the same way as the operations would have been performed on an original, unencoded database. The database language SQL is an American National Standards Institute standard for accessing database systems, that is supported by all of the major database management vendors. There is a command of the form CREATE INDEX in SQL that can be used to ensure efficient access to a semantically encoded subtable and an interconnection table.

A semantically encoded subtable and an interconnection table can not only be indexed when the database is first encoded, but can also be re-indexed, using SQL, if the usage of the database changes.

Without knowledge of the key information, an unauthorized user or program cannot know the effect of any updates he or it may try to make on the data seen by authorized users or programs. However, an authorized user of program can use the key information to make updates into the sub-tables and interconnection table, and the results will appear to authorized users or programs as though the updates had been made on an original, unencoded table.

An authorized user or program using, say, a client computer connected to a server, can use the key information to query and update a semantically encoded database on the server. The answer to a query can be sent in from the server to the client in semantically encoded form, and the client can decode it using the key information. The client can also prepare an update using the key information, and can send it, semantically encoded, to the server.

Since only authorized users can access the information in a semantically encoded database, and since it is easy to change the key information needed for access, users can be billed for access. If, for example, the key information is changed regularly, we can re-authorize only those users who have paid their bills.

In summary, the present invention discloses a method, apparatus, and article of manufacture for semantic encoding and decoding of tables of information optionally used for billing for use of the information. The present invention provides an improved system for encoding information, in that the information cannot be decoded without knowledge of the permutations, the keys or key numbers, and the equation used to combine the permutations and keys or key numbers.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer-implemented method for encoding and compressing at least one table of data, comprising the steps of:

splitting each table into two or more subtables; and
   permuting the subtables using at least one key; and
   selecting one of the splitting of a table into subtables,
   the permutations, the key, an equation, a sub-method to combine the permutations and the key, row numbers in the subtables, row numbers in an optional interconnection array and optional padding rows, such that any attempt to obtain information, without knowledge of the permutations, key and equation, and if joining the subtables with an interconnection array, results in one of a table that could be the original table but is not the original table, optionally not including any rows of the original table.

2. The method of claim 1, wherein creating an interconnection table that can also be permuted, such that the at least one table of data cannot be correctly queried or reconstructed from the subtables and the interconnection table without knowledge of the permutation and the key.

3. The method of claim 2, wherein padding the interconnection table with additional data.

4. The method of claim 2, wherein padding the interconnection table with additional data, such that any attempt to query or reconstruct a table from its subtables and padded interconnection table, by joining the subtables and the padded interconnection table, without knowledge of the permutations and keys used to construct the subtables and the unpadded interconnection table, does not reveal any row from the original table.

5. The method of claim 2, wherein padding the interconnection table with additional data, such that the number of rows in the original table is hidden.

6. The method of claim 5, wherein selecting the padding of the interconnection table, such that permuted row numbers which can actually be used, given knowledge of permutations and the key, to query or reconstruct a table from subtables and the interconnection table, are disguised by the padding, such that information in the padded interconnection table appears to be statistically uniform.

7. The method of claim 1, wherein the at least one key comprises a key number.

8. The method of claim 1, wherein a source table is split into subtables, each subtable having a subset of the columns of the source table.

9. The method of claim 1, wherein individual data items in a source column of a source table are each split one or more times, each source column giving rise to two or more columns in at least one subtable.

10. The method of claim 1, wherein splitting the subtables to produce sub-subtables.

11. The method of claim 1, wherein padding the permuted table with additional data.

12. The method of claim 1, wherein padding the permuted table with additional data, such that any attempt to query or reconstruct an original table, by joining the padded subtables, without knowledge of the key used to construct the subtables, does not reveal any row from the original table.

13. The method of claim 1, wherein the source of the data to be encoded is a bulk load destined for a single table in the database.

14. The method of claim 1, wherein the method is used as the only security technique.

15. The method of claim 1, wherein the method is used in combination with at least one of the alternative methods for providing security for a database, the alternative methods including: (a) access controls; (b) selectively encrypting the entries in tables of data; and (c) accessing or transmitting data via a virtual or physical private network.

16. The method of claim 1, wherein the method is used for highly secure distribution of copies of data tables over a network, such that there is no need to encrypt individual names, numbers, or other data items in order to hide the relationships between them.

17. The method of claim 1, wherein:

removing duplicated rows from the subtables; and creating an interconnection table.

18. The method of claim 1, wherein the method supports authorized access to at least one set of data in a database to at least one authorized user.

19. The method of claim 1, wherein providing one of non-sequential row numbering and labeling for at least one table of data.

20. The method of claim 1, wherein permuting the positions of the rows of the subtables according to one of a permutation, a formula, a key and a formula governed by a key.

21. The method of claim 1, wherein modifying one of the row numbers and labeling of the subtables according to one of a permutation, a formula, a key and a formula governed by a key.

22. The method of claim 1, wherein:

constructing at least one interconnection table, the interconnection table containing one of row numbers and labels of the subtables; and modifying one of the row numbers and labels of the interconnection table according to one of a permutation, a formula, a key and a formula governed by a key.

23. The method of claim 1, wherein combining one of a permutation and a key using an equation, such that knowledge of the permutation or key and the structure of the equation is necessary in order to correctly reconstruct one or more rows of the original table.

24. The method of claim 1, wherein storing a collection of permutations in the database for use during encoding and decoding.

25. The method of claim 1, wherein managing the collection and generation of permutations for use in encoding and decoding by numbering the permutations using an indexing notation.

26. The method of claim 1, wherein the indexing notation is a base-factorial notation.

27. The method of claim 1, wherein modifying at time intervals one of the permutations, row numbers, equations and interconnection tables used for encoding and decoding in order to defend an encoded database against key theft and other attacks.

28. The method of claim 1, wherein querying the subtables and interconnection tables using a database language, given knowledge of one of the permutations, key, and an equation, to correctly obtain information present in the original tables.

29. The method of claim 1, wherein statically indexing one of the subtables and an interconnection table using a database language.

30. The method of claim 1, wherein dynamically indexing one of the subtables and an interconnection table at one of a query time and an update time using a database language.

31. The method of claim 1, wherein modifying data in the semantically encoded subtables and an interconnection table; and logically updating a non-encoded table that the subtables and the interconnection table represent using a database language and given knowledge of one of the permutations, the key and the equation.

32. The method of claim 1, wherein:

permitting a first computer access to a second computer over a network;

making only the permutations, key and the equation available to authorized computers;

allowing the authorized computer to question the data secured on the second computer;

securely transmitting semantically encoded answers to the questions; and allowing the authorized computer to decode the answers using one of the permutations, the key and the equation.

33. The method of claim 32, wherein billing users of the authorized computer for usage of the data.

34. The method of claim 33, wherein:

modifying the semantic encoding of the data on the second computer; and reauthorizing at the authorized computer by transmitting to the authorized computer encrypted versions of one of new permutations, new index numbers of permutations, a new key, and a new equation.

35. The method of claim 1, wherein encrypting one of the permutation, an index number of a permutation, a key, a structure of an equation by one of a private key and a public key, for transmission over a network to an authorized computer.

* * * * *